(12) United States Patent
Ikeda et al.

(10) Patent No.: US 8,931,263 B2
(45) Date of Patent: Jan. 13, 2015

(54) EXHAUST GAS PURIFYING SYSTEM

(75) Inventors: Takashi Ikeda, Fujisawa (JP); Takayuki Furukawa, Fujisawa (JP); Keizou Kanenobu, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 163 days.

(21) Appl. No.: 13/699,509

(22) PCT Filed: May 16, 2011

(86) PCT No.: PCT/JP2011/061219
§ 371 (c)(1),
(2), (4) Date: Nov. 21, 2012

(87) PCT Pub. No.: WO2011/148816
PCT Pub. Date: Dec. 1, 2011

(65) Prior Publication Data
US 2013/0061583 A1    Mar. 14, 2013

(30) Foreign Application Priority Data
May 25, 2010  (JP) .................. 2010-119721

(51) Int. Cl.
*F01N 3/00*  (2006.01)
*F01N 1/00*  (2006.01)
(Continued)

(52) U.S. Cl.
CPC .............. *F02D 41/029* (2013.01); *F01N 3/035* (2013.01); *F02D 9/06* (2013.01); *F02D 41/024* (2013.01);
(Continued)

(58) Field of Classification Search
USPC ............ 60/276, 285, 286, 295, 297, 311, 324
See application file for complete search history.

(56) References Cited

U.S. PATENT DOCUMENTS 6,655,133 B2 * 12/2003 Mikami et al. .................. 60/296
7,406,823 B2 *  8/2008 Takahashi ....................... 60/324
(Continued)

FOREIGN PATENT DOCUMENTS

JP    2000-303826    10/2000
JP    2007-205223     8/2007
(Continued)

OTHER PUBLICATIONS

Patent Abstracts of Japan, Publication No. 2000-303826, Published Oct. 31, 2000.
(Continued)

*Primary Examiner* — Thomas Denion
*Assistant Examiner* — Diem Tran
(74) *Attorney, Agent, or Firm* — Staas & Halsey LLP

(57) ABSTRACT

An exhaust pipe for a diesel engine is connected to a diesel particulate defuser ("DPD"). To automatically regenerate the DPD, an exhaust gas temperature is detected, a deviation of the detected exhaust gas temperature from a target regeneration temperature is evaluated, and an amount of post injection is controlled through PID control according to the deviation. When, during the automatic regeneration with a vehicle running, an exhaust brake valve is closed, the post injection is interrupted. While the exhaust brake is being closed, an operation of an integral control term is continued with the PID control, and when the exhaust brake valve is opened, the integral control term operated without interruption is used as an initial amount of operation.

3 Claims, 4 Drawing Sheets

(51) Int. Cl.
*F01N 3/02* (2006.01)
*F02D 41/02* (2006.01)
*F01N 3/035* (2006.01)
*F02D 9/06* (2006.01)
*F02D 41/10* (2006.01)
*F02D 41/14* (2006.01)
*F02D 41/40* (2006.01)
*F01N 3/10* (2006.01)
*F01N 3/023* (2006.01)

(52) U.S. Cl.
CPC .......... *F02D 41/107* (2013.01); *F02D 41/1446* (2013.01); *F02D 41/1482* (2013.01); *F02D 41/405* (2013.01); *F02D 2041/1409* (2013.01); *F02D 2700/04* (2013.01); *Y02T 10/44* (2013.01); *Y02T 10/26* (2013.01); *F01N 3/106* (2013.01); *F01N 3/0235* (2013.01)
USPC .................. 60/295; 60/285; 60/286; 60/297; 60/311; 60/324

(56) References Cited

U.S. PATENT DOCUMENTS

| | | | |
|---|---|---|---|
| 7,895,830 B2* | 3/2011 | Otsubo et al. | 60/292 |
| 2005/0217252 A1 | 10/2005 | Sato et al. | |
| 2006/0048505 A1* | 3/2006 | Takahashi | 60/295 |
| 2009/0007547 A1 | 1/2009 | Onodera et al. | |
| 2009/0107430 A1* | 4/2009 | Daigo | 123/90.15 |

FOREIGN PATENT DOCUMENTS

| | | |
|---|---|---|
| JP | 2008-144726 | 6/2008 |
| JP | 4175281 | 8/2008 |

OTHER PUBLICATIONS

Patent Abstracts of Japan, Publication No. 2007-205223, Published Aug. 16, 2007.

Patent Abstracts of Japan, Publication No. 2008-144726, Published Jun. 26, 2008.

International Search Report of PCT/JP2011/061219 mailed Jun. 28, 2011.

Written Opinion of the International Searching Authority mailed Jun. 28, 2011 in corresponding International Application No. PCT/JP2011/061219.

* cited by examiner

EXHAUST GAS PURIFYING SYSTEM

CROSS REFERENCE TO RELATED APPLICATIONS

This application claims the foreign priority benefit of Japanese Application No. 2010-119721 filed May 25, 2010, the contents of which are incorporated herein by reference, which serves as priority for PCT Application No. JP2011/061219 filed May 16, 2011.

TECHNICAL FIELD

The present invention relates to exhaust gas purifying systems for capturing particulate matter (PM) and purifying NOx in exhaust gas before discharging the exhaust gas from diesel engines. More particularly, the present invention relates to an exhaust gas purifying system used during automatic regeneration of a diesel particulate defuser ("DPD") when a vehicle is accelerated/decelerated.

BACKGROUND ART

As exhaust gas purifying systems for purifying and discharging exhaust gas from diesel engines, those with a diesel particulate defuser (DPD) and a selective catalytic reduction (SCR) device attached to an exhaust pipe have been developed.

In this type of exhaust gas purifying system, the DPD captures PM in the exhaust gas. This type of exhaust gas purifying system is provided with an SCR system including the SCR device. In the SCR system, a urea solution stored in a urea tank is supplied into the exhaust gas upstream of the SCR to generate ammonia with heat of the exhaust gas. The ammonia is then used to reduce and purify NOx on the SCR catalyst (refer to, for example, Patent Documents 1 and 2).

PM captured by the DPD may clog a filter of the DPD. It is thus necessary to appropriately oxidize and remove PM captured and accumulated by the DPD to regenerate the DPD.

To detect clogging of the filter, an exhaust gas pressure sensor detects a differential pressure across the DPD. When the differential pressure reaches an upper limit, an engine control unit (ECU) automatically starts regeneration of the DPD. Alternatively, to start the regeneration in a manual manner, a DPD warning lamp in a cabin is illuminated to prompt a driver to press a regeneration start switch.

The DPD is provided with a diesel oxidation catalyst ("DOC") and a catalyzed soot filter (CSF). The DOC includes an active catalyst for oxidizing unburned fuel. The CSF captures PM in the exhaust gas. During the regeneration of the DPD, multiple fuel injections are delivered (pilot injection, pre-injection, main injection, and after-injection) to increase an exhaust gas temperature to or above a catalyst active temperature of the DOC. Post injection is then added to increase the exhaust gas temperature to 500° C. or above, so that the obtained hot exhaust gas burns and removes PM captured by the CSF.

The DPD may be regenerated automatically while a vehicle is running or manually at an idle rpm while the vehicle is stopping. In general, the DPD is regenerated automatically with a vehicle running. Since the post injection causes fuel to mix into lubricant in a cylinder and thus dilute the lubricant, the manual regeneration is available to reduce the level of dilution.

During the automatic regeneration with a vehicle running, if the vehicle stops, an exhaust brake valve is designed to close in order to prevent an exhaust gas temperature from dropping. This is to allow the DPD to be regenerated at an idle rpm without interruption.

During the automatic regeneration, an exhaust gas temperature sensor disposed downstream of the DOC is used to detect the temperature of the exhaust gas flowing into the CSF. A deviation of the detected exhaust gas temperature from a target regeneration temperature is then evaluated. The deviation is used for proportional-integral-derivative ("PID") control to adjust an amount of post injection so as to achieve the target regeneration temperature.

PRIOR ART DOCUMENTS

Patent Document 1: Japanese Patent Application Publication No. 2000-303826
Patent Document 2: Japanese Patent No. 4175281

During the automatic regeneration with a vehicle running, if sudden deceleration with the exhaust brake valve closed and sudden acceleration are repeated, a turbo charger operating during the acceleration causes a sharp rise of a boost pressure, increasing an amount of air flowing through the DPD and scavenging the interior of the DPD. This lowers a temperature of the DPD even with the post injection ongoing. In addition, if the exhaust brake valve is closed during deceleration, for example, on a descending hill, or if the exhaust brake is activated for sudden deceleration following sudden acceleration, an amount of exhaust gas is reduced, degrading the tracking capability of the PID control for the post injection.

Under driving conditions as described above, the post injection is traditionally interrupted when an amount of fuel injection is lowered to a predetermined amount or the exhaust brake valve is closed. The post injection is restarted with the PID control when the exhaust brake valve is opened or a stabilized driving condition is achieved in order to resume the automatic regeneration with the vehicle running.

However, the interruption of the post injection every time deceleration takes place during the automatic regeneration with the vehicle running, together with the resumption of the post injection through the PID control, forces an integral control term to reset an amount of operation integrated just until then to zero before the term restarts integrating deviations. This results in a longer period of time taken to increase the exhaust gas temperature to the target regeneration temperature, and thus a longer period of time taken for the automatic regeneration.

Similarly, the PID control has to be restarted every time the post injection is interrupted due to a closed exhaust brake valve, making it difficult to control the post injection to achieve an appropriate amount.

SUMMARY OF THE INVENTION

An object of the present invention is to provide an exhaust gas purifying system that can resolve the above-mentioned problems and accurately control post injection through PID control even when acceleration and deceleration are repeated or when an exhaust brake valve is closed during automatic regeneration with a vehicle running.

There is provided an exhaust gas purifying system including: a DPD connected to an exhaust pipe of a diesel engine and configured to capture PM in exhaust gas, the exhaust gas purifying system being configured to, when an amount of PM in the DPD reaches or exceeds a predetermined amount, deliver post injection to increase temperature of the exhaust gas from the diesel engine for automatically regenerating the DPD, wherein the exhaust gas purifying system is configured to detect the temperature of the exhaust gas, evaluate a deviation of the detected temperature of the exhaust gas from a target regeneration temperature, and use PID control based on the deviation for controlling an amount of post injection for the automatic regeneration, and the exhaust gas purifying system, during the automatic regeneration with a vehicle running, interrupts the post injection when an exhaust brake valve is closed and continues to perform an operation of an integral control term through the PID control while the exhaust brake is being closed, and uses the integral control term operated without interruption as an initial amount of operation when the exhaust brake valve is opened.

There is also provided an exhaust gas purifying system wherein the post injection is continued through the PID control when the vehicle is decelerated while the exhaust brake valve is open.

There is also provided an exhaust gas purifying system wherein the PID control is reset when the vehicle is decelerated and then stopped.

The present invention exerts superb effects, where an amount of post injection can be controlled accurately through PID control according to driving conditions during automatic regeneration with a vehicle running.

BRIEF DESCRIPTION OF THE DRAWINGS

FIG. 4(*a*) is a chart of a relationship among post injection, an exhaust brake valve, an integral control term of PID control, and an exhaust gas temperature during automatic regeneration with a vehicle running of a traditional example.

DETAILED DESCRIPTION

Preferred embodiments of the present invention will now be described in detail with reference to the accompanying drawings.

Figure 1:
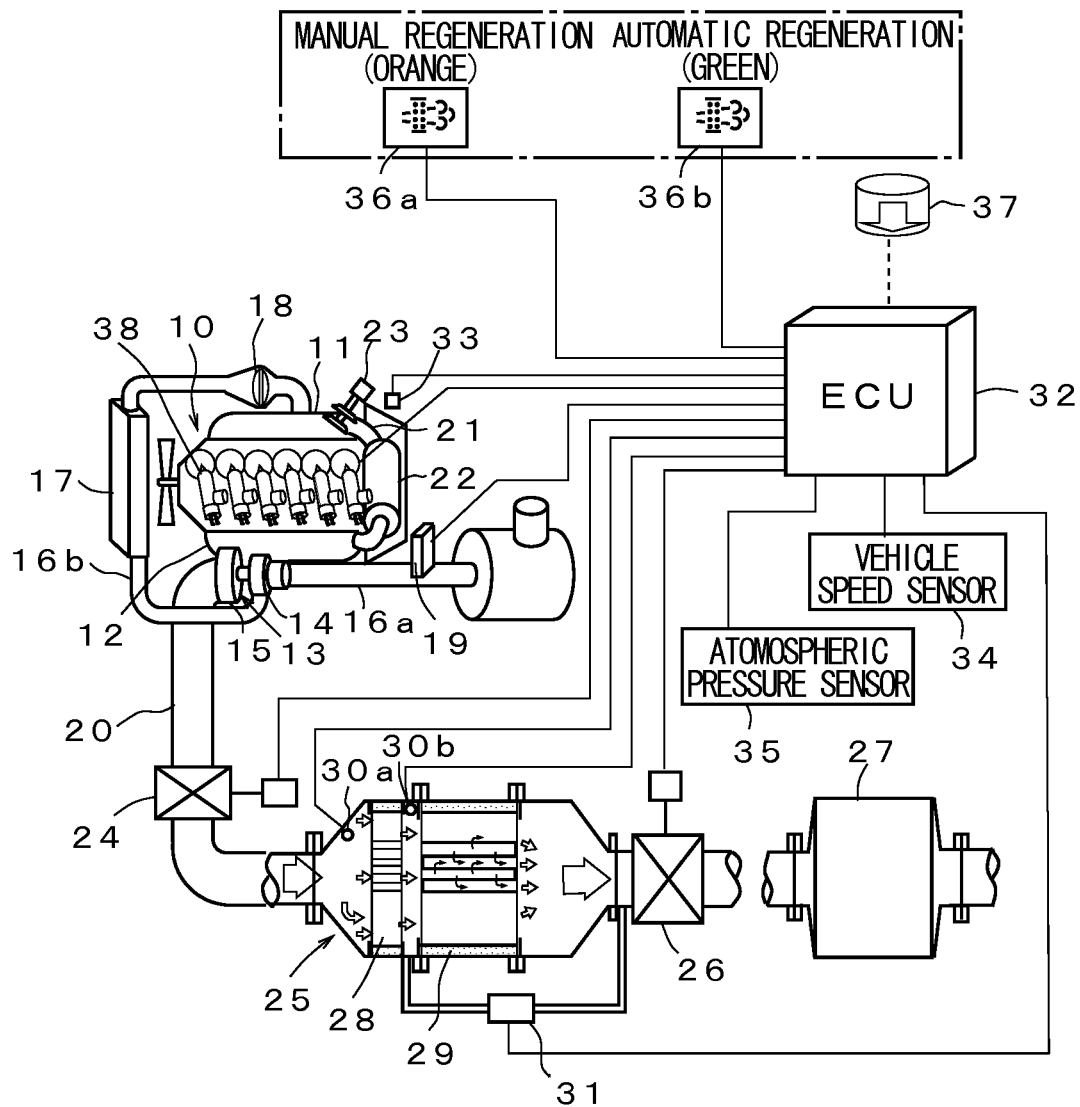
FIG. 1 is an overall block diagram of one embodiment of the present invention.

With reference to FIG. 1, a diesel engine 10 is provided with an intake manifold 11 and an exhaust manifold 12, which are coupled to a compressor 14 and a turbine 15 of a supercharger 13, respectively. Air flows from an upstream intake pipe 16*a* and is pressurized by the compressor 14. The air is cooled when flowing through an inter-cooler 17 of a downstream intake pipe 16*b*. The air then flows through an intake throttle valve 18 and is supplied to the diesel engine 10 from the intake manifold 11. An exhaust gas from the diesel engine 10 drives the turbine 15 and then is discharged to an exhaust pipe 20.

The upstream intake pipe 16*a* is provided with an air mass flow sensor (MAF) 19. The air mass flow sensor (MAF) measures an amount of intake air and controls an opening of the intake throttle valve 18 to adjust the amount of intake air. An EGR pipe 21 is connected to the exhaust pipe 20 and the upstream intake pipe 16*a* to return part of the exhaust gas to an intake air system of the engine 10 in order to reduce NOx. The EGR pipe 21 is connected to an EGR cooler 22 and an EGR valve 23.

The exhaust pipe 20 is connected to an exhaust brake valve 24, a DPD 25, an exhaust throttle valve 26, and a silencer 27. The DPD 25 includes a DOC 28 and a catalyzed soot filter (CSF) 29. The DOC 28 includes an active catalyst to oxidize unburned fuel. The CSF 29 captures PM in the exhaust gas. An SCR device (not shown) is disposed between the exhaust throttle valve 26 and the silencer 27 to denitrify NOx with ammonia.

Exhaust gas temperature sensors 30*a* and 30*b* are disposed before and after the DOC 28. A differential pressure sensor 31 is provided to detect an amount of PM accumulation in the CSF 29. Values detected by these sensors are input into an engine control unit (ECU) 32.

The ECU 32 receives detected values from a rotation sensor 33 that detects an engine rpm, a vehicle speed sensor 34, and an atmospheric pressure sensor 35.

The ECU 32 controls an amount of fuel injection from a fuel injector 38 according to an accelerator opening while a vehicle is running. The ECU 32 also controls the intake throttle valve 18, the exhaust brake valve 24, and the exhaust throttle valve 26 as required.

The differential pressure sensor 31 detects a differential pressure across the CSF 29. In this exhaust gas treatment system, the ECU 32 increases the temperature of the exhaust gas flowing from the diesel engine 10 to burn PM and regenerate the DPD 25 when the ECU 32 determines that a PM accumulation reaches a predetermined amount in the DPD 25 according to a value detected by the differential pressure sensor 31, or when a mileage since a last regeneration reaches a predetermined value.

For regenerating the DPD 25, the fuel injector 38 delivers multiple injections (pilot injection, pre-injection, main injection, and after-injection) to increase the exhaust gas temperature to or above a catalyst active temperature of the DOC 28. The fuel injector 38 then delivers post injection to increase the exhaust gas temperature to about 500° C. to burn PM. The DPD 25 is normally regenerated automatically while a vehicle is running. The post injection causes fuel to mix into lubricant in a cylinder and thus dilute the lubricant. A manual regeneration is available to reduce the level of dilution.

Figure 2:
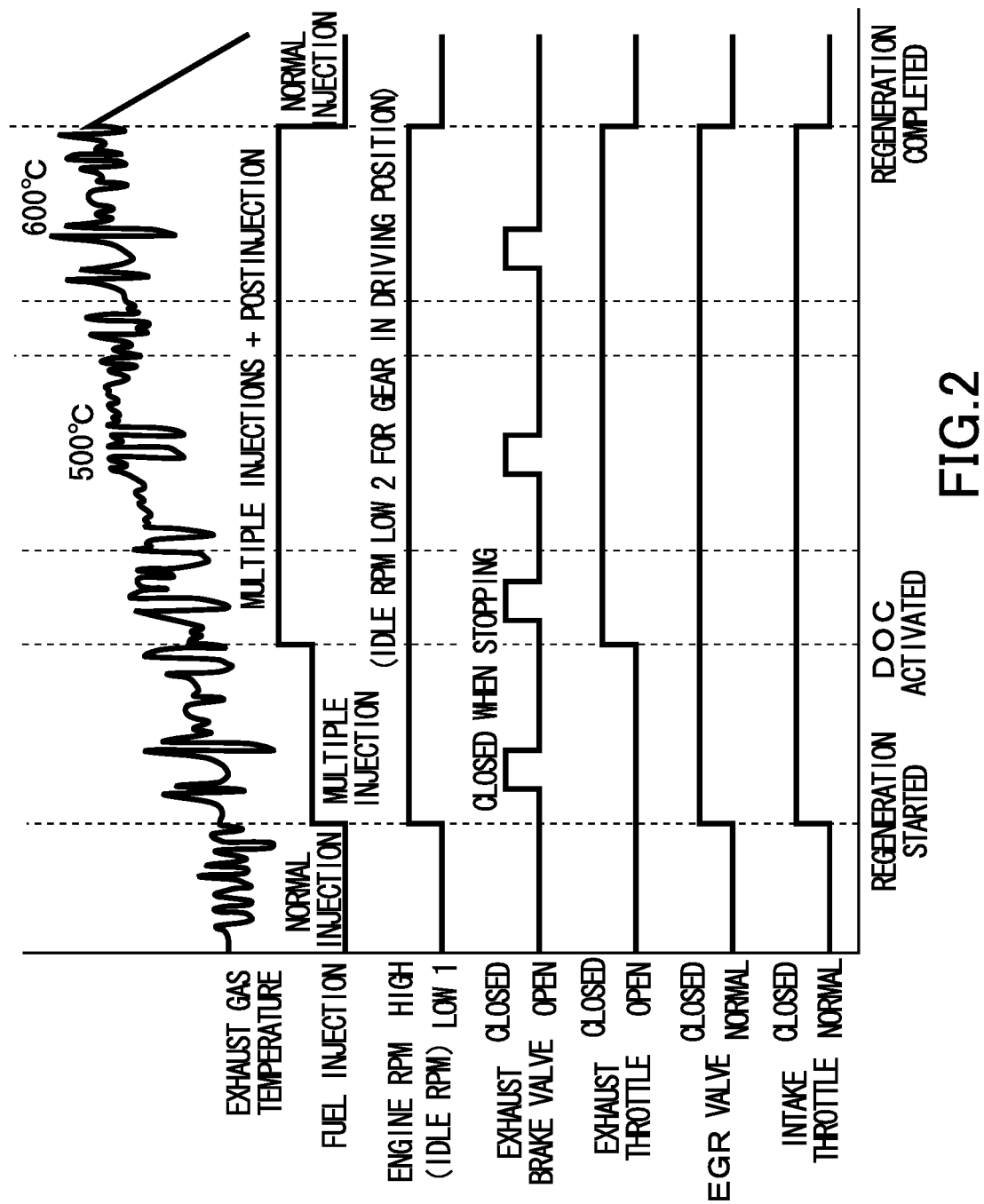
FIG. 2 is a control chart of automatic regeneration according to the present invention.

With reference to FIG. 2, a control chart of the ECU 32 for an automatic regeneration will now be described.

To perform the automatic regeneration, the ECU 32 reduces an opening of the intake throttle valve 18, closes the EGR valve 23, and enables multiple injections to increase the exhaust gas temperature to the catalyst active temperature so that the catalyst active temperature of the DOC 28 is increased. The ECU 32 then adds post injection to the multiple injections so as to increase the exhaust gas temperature to about 500° C. so that PM is burned and the DPD 25 is thereby regenerated. The ECU 32 resumes normal control for the intake throttle valve 18 and the EGR valve 23 when the regeneration is completed.

During the automatic regeneration, the vehicle may be stopping for a traffic light, for example. In such a case, if a transmission gear is in a neutral position, an engine rpm is changed from a normal idle rpm (low 1) to a regenerating idle rpm that is an rpm (high) higher than the normal idle rpm. If the gear is in a driving position, the regenerating idle rpm is set to an rpm (low 2) lower than the rpm set for the neutral position of the gear in order to prevent sudden acceleration when the vehicle pulls away. The ECU 32 turns on an automatic regeneration warning lamp 36*b* when the automatic regeneration is ongoing.

Figure 3:
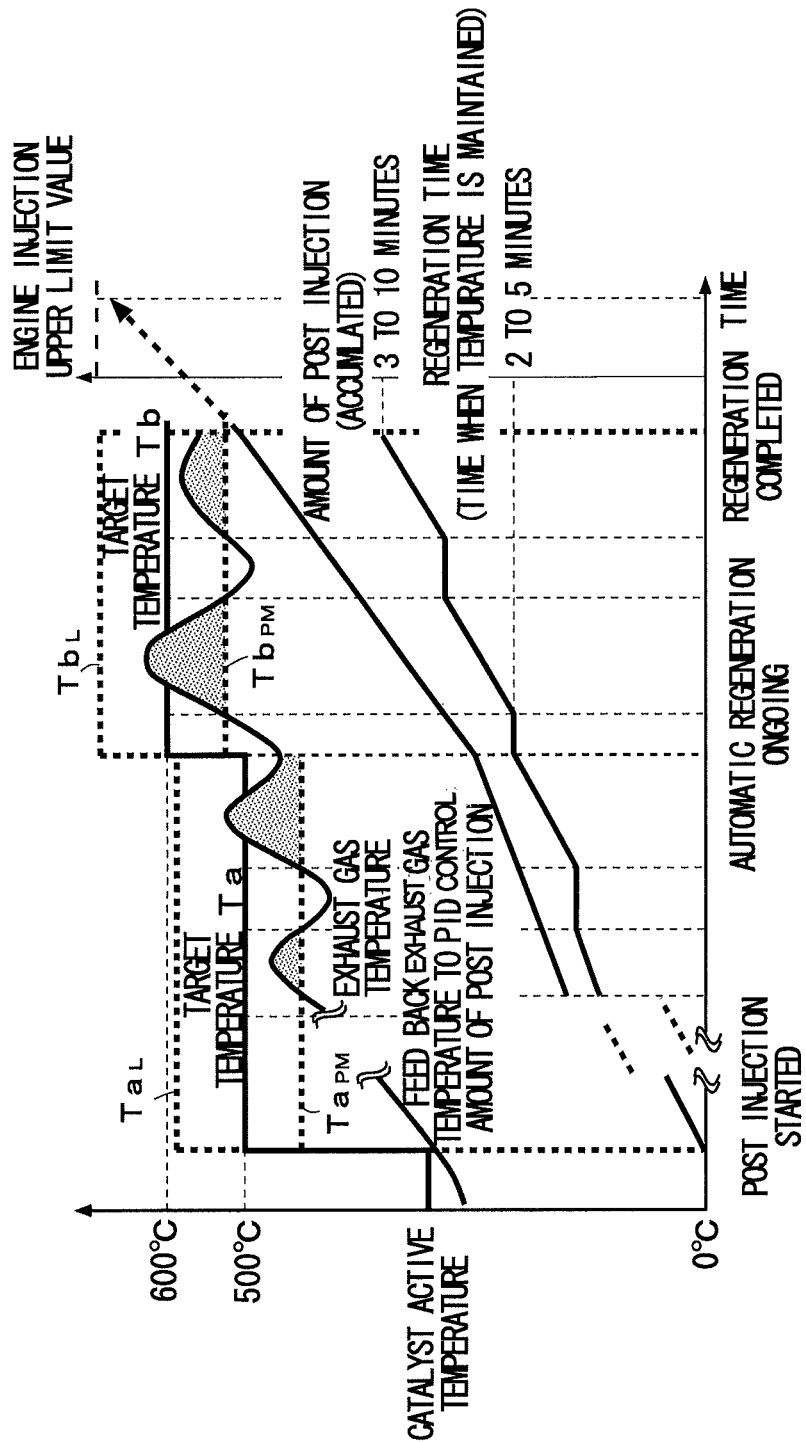
FIG. 3 is a control chart of automatic regeneration during driving and idling according to the present invention.

FIG. 3 is a chart of exhaust gas target temperatures, an accumulated amount of post injection, and regenerating time counted for an automatic regeneration.

To regenerate the DPD, it is necessary to switch from multiple injections to post injection. To prevent rapid combustion of accumulated PM due to an elevated temperature of the exhaust gas, an initial target regeneration temperature is set to, for example, about 500° C. to burn PM in the DPD to a certain extent. The target temperature is then changed to a final target regeneration temperature that is higher than the initial target regeneration temperature at, for example, about 600° C. An amount of post injection is controlled to achieve these target temperatures.

In the meantime, the ECU 32 sets a PM combustion determination temperature TaPM that is lower than the initial target regeneration temperature Ta. In FIG. 3, the PM combustion determination temperature TaPM is shown with a broken line. If the exhaust gas temperature is equal to or higher than the PM combustion determination temperature TaPM, the ECU 32 determines that PM is burning and accumulates the time elapsed. When the accumulated time reaches a certain value, for example, 2-5 minutes, the ECU 32 changes the target temperature to the final target regeneration temperature Tb. The ECU 32 again sets a PM combustion determination temperature TbPM that is lower than the final target regeneration temperature Tb. If the exhaust gas temperature is equal to or higher than the PM combustion determination temperature TbPM, the ECU 32 determines that PM is burning and accumulates the time elapsed. When the accumulated time reaches a certain value, for example, 3-10 minutes, the ECU 32 determines that the regeneration is complete.

If the exhaust gas temperature is not equal to or higher than the PM combustion determination temperature TaPM or TbPM for a sufficiently long period of time, and thus the time elapsed is not accumulated, and if the accumulated amount of post injection reaches or exceeds an engine injection upper limit value, the ECU 32 determines that the regeneration is not complete.

Post injection upper limit temperatures $Ta_L$ and $Tb_L$ are set above the target regeneration temperatures Ta and Tb, respectively. If, during the automatic regeneration, the exhaust gas temperature reaches or exceeds the post injection upper limit temperature $Ta_L$ or $Tb_L$, the post injection is interrupted to prevent melting of the DPD.

To manually regenerate the DPD, the ECU 32 flashes a manual regeneration warning lamp 36a to advise a driver of a need for manual regeneration. When the driver accordingly stops a vehicle and presses a DPD manual regeneration start switch 37, the manual regeneration is started.

To perform the manual regeneration, the ECU 32 increases an engine rpm from an idle rpm to a regeneration idle rpm. The ECU 32 reduces an opening of the intake throttle valve 18, and closes the EGR valve 23 and the exhaust brake valve 24. The ECU 32 enables multiple injections to increase the exhaust gas temperature. Once the exhaust gas temperature is increased, the ECU 32 opens the exhaust brake valve 24 and closes the exhaust throttle valve 26. The ECU 32 adds post injection to the multiple injections to increase the exhaust gas temperature to about 500° C. so as to burn PM and regenerate the DPD 25. In the manual regeneration, the target regeneration temperatures Ta and Tb described with reference to FIG. 3 are also set and the time taken for the regeneration is accumulated.

PID control for an amount of post injection will now be described.

During an automatic regeneration, the exhaust gas temperature sensor 30b described with reference to FIG. 1 detects an exhaust gas temperature. The ECU 32 evaluates a deviation e of the exhaust gas temperature from the target regeneration temperature Ta or Tb described above. The ECU 32 uses PID control based on the deviation to determine an amount of operation M for post injection by the fuel injector 38.

The amount of operation M is defined by the following expression:

$$M = Kp \cdot e + Ki \cdot (1/Ti) \cdot \int e\, dt + Kd \cdot Td (de/dt)$$

where Kp is a proportional constant for proportional control; Ki is a proportional constant for integral control; Kd is a proportional constant for derivative control; Ti is an integral time; Td is a derivative time; and t is time.

A sum of a proportional control term, an integral control term, and a derivative control term determines the amount of operation M. An actual amount of post injection is determined by the amount of operation M added to an amount of operation from a base term, and a fuel pressure and a valve opening time of the fuel injector 38.

The PID control, together with a higher engine rpm during the automatic regeneration with a vehicle running, enables the exhaust gas temperature to be increased according to an amount of post injection, allowing the exhaust gas temperature to be accurately controlled to the target regeneration temperature Ta or Tb.

During the automatic regeneration, if a vehicle repeats sudden acceleration and sudden deceleration, or if a driver closes the exhaust brake valve while the vehicle is running downhill, the post injection is interrupted. This is because, if the post injection is continued, a temperature inside the DPD 25 increases rapidly, posing a risk of the temperature exceeding a post injection upper limit temperature $Ta_L$ or $Tb_L$.

Figure 4A:
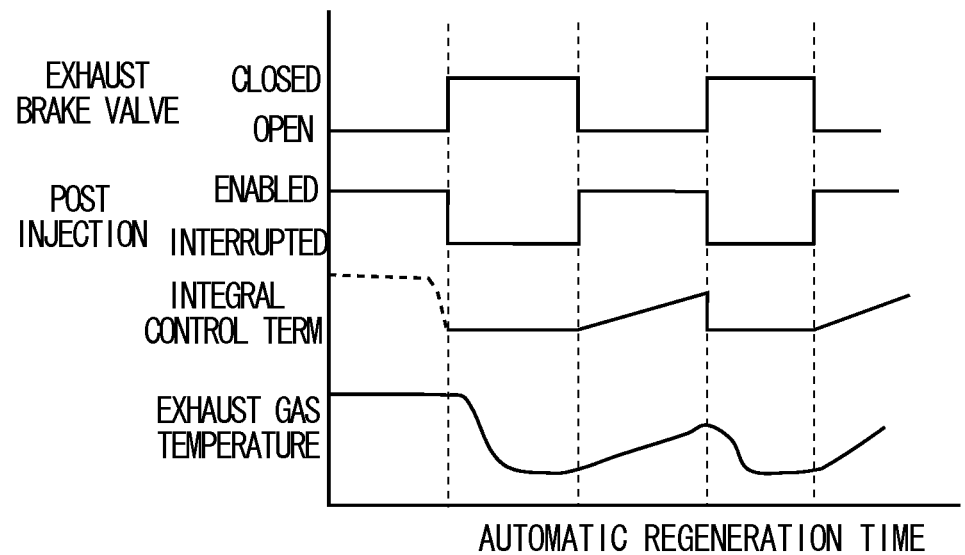
FIG. 4(*b*) is a chart of a relationship among post injection, an exhaust brake valve, an integral control term of PID control, and an exhaust gas temperature during automatic regeneration with a vehicle running according to the present invention.

With reference to FIG. 4(a), when an exhaust brake valve is closed, post injection is traditionally interrupted and at the same time PID control is stopped. The post injection is restarted through the PID control when the exhaust brake valve is opened. In the meantime, an integral control term of the PID control is reset to zero when the PID control is stopped, and hence the term has to restart integrating a deviation e when the PID control is started. If the exhaust brake valve is then closed again, the integral control term is reset to zero again. This prevents an appropriate control of an amount of post injection, causing the exhaust gas temperature to decrease every time the exhaust brake valve is closed. This is problematic because the exhaust gas temperature cannot be controlled to the target regeneration temperature Ta or Tb, consequently extending the time taken for the regeneration or leaving the regeneration unfinished.

Figure 4B:
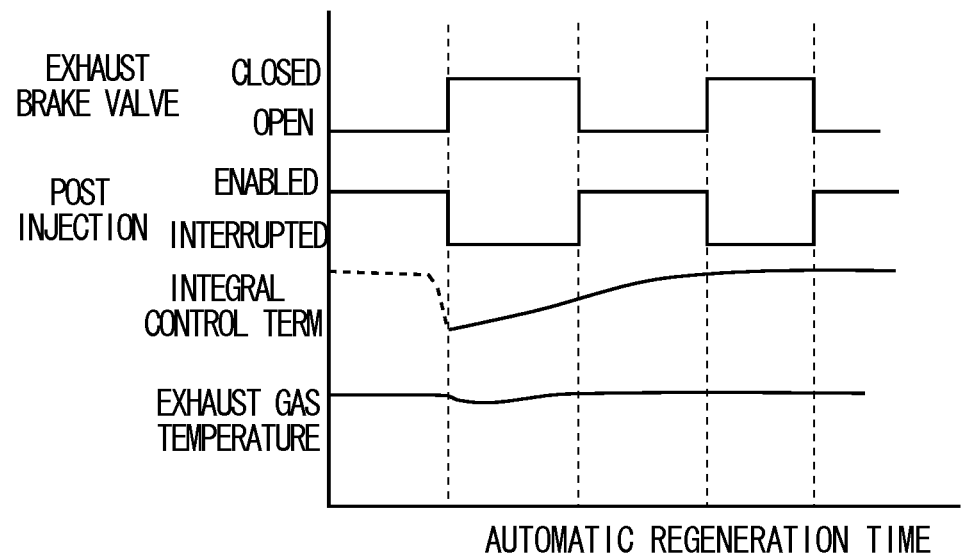

According to the present invention, with reference to FIG. 4(b), when the exhaust brake valve is closed, post injection is interrupted but PID control is allowed to continue without resetting. This allows an integral control term to continue integrating a deviation e, even if the exhaust brake valve is frequently closed and opened during repeated sudden acceleration/sudden deceleration. When the exhaust brake valve is opened, therefore, an amount of operation from the integral control term is added to the post injection as an initial amount of operation for the PID control, enabling the exhaust gas temperature to be maintained at the target regeneration temperature Ta or Tb.

Traditionally, if a vehicle is accelerated suddenly and then decelerated with an accelerator pedal released, post injection is interrupted when a total amount of fuel injection is lowered to a predetermined value and at the same time PID control is reset to zero. The post injection is resumed with the PID control when the total amount of fuel injection reaches or exceeds a predetermined value. The problem with this control is that the exhaust gas temperature fluctuates with every acceleration/deceleration. According to the present invention, the PID control is allowed to continue during deceleration, so that the exhaust gas temperature can be maintained at the target regeneration temperature Ta or Tb. The post injection is designed to continue in this case. The integral control term is reset to zero when the vehicle is stopped following the deceleration so that the PID control may be appropriate without causing any problem when the vehicle then pulls away.

As described above, according to the present invention, when an amount of post injection is controlled through PID control during automatic regeneration with a vehicle running, the post injection is interrupted if an exhaust brake is closed due to sudden deceleration. The PID control, however, is allowed to continue and causes an integral control term to keep integrating a deviation. This allows the PID control to be performed appropriately on the amount of post injection even when the vehicle is accelerated again after the deceleration.

The invention claimed is:

1. An exhaust gas purifying system comprising:
    a diesel particulate defuser connected to an exhaust pipe of a diesel engine and configured to capture particulate matter in exhaust gas,
    the exhaust gas purifying system being configured to, when an amount of the particulate matter in the diesel particulate defuser reaches or exceeds a predetermined amount, deliver post injection by infecting fuel into a cylinder of the engine to increase temperature of the exhaust gas from the diesel engine for automatically regenerating the diesel particulate defuser,
    wherein the exhaust gas purifying system is further configured to detect the temperature of the exhaust gas, evaluate a deviation of the detected temperature of the exhaust gas from a target regeneration temperature, and use proportional integral derivative control based on the deviation for controlling an amount of the post injection for the automatic regeneration, and
    the exhaust gas purifying system, during the automatic regeneration with a vehicle running, interrupts the post injection when an exhaust brake valve is closed and continues to perform an operation of an integral control term through the proportional-integral-derivative control while the exhaust brake is being closed, and uses the integral control term operated without interruption as an initial amount of operation when the exhaust brake valve is opened.

2. The exhaust gas purifying system according to claim 1, wherein the post injection is continued through the proportional-integral-derivative control when the vehicle is decelerated while the exhaust brake valve is open.

3. The exhaust gas purifying system according to claim 1, wherein the proportional-integral-derivative control is reset when the vehicle is decelerated and then stopped.

* * * * *